(12) United States Patent
Coers et al.

(10) Patent No.: US 7,963,361 B2
(45) Date of Patent: Jun. 21, 2011

(54) STEERING AXLE TRANSPORT POSITIONING STRUCTURE AND METHOD

(75) Inventors: Bruce A. Coers, Hillsdale, IL (US); Daniel J. Burke, Cordova, IL (US); Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 141 days.

(21) Appl. No.: 12/236,800

(22) Filed: Sep. 24, 2008

(65) Prior Publication Data

US 2010/0075727 A1   Mar. 25, 2010

(51) Int. Cl.
*B62D 5/00* (2006.01)
(52) U.S. Cl. ........................................ 180/403; 180/906
(58) Field of Classification Search ................. 180/403, 180/408, 411, 906; 280/5.52
See application file for complete search history.

(56) References Cited

U.S. PATENT DOCUMENTS

| | | | | |
|---|---|---|---|---|
| 4,546,997 A * | 10/1985 | Smyers | ...................... | 280/5.509 |
| 5,020,814 A * | 6/1991 | George et al. | ................. | 280/204 |
| 6,267,387 B1 * | 7/2001 | Weiss | ........................... | 280/5.52 |
| 6,279,920 B1 * | 8/2001 | Choudhery | ................ | 280/5.521 |
| 6,293,561 B1 * | 9/2001 | Goetzen et al. | .............. | 280/5.52 |
| 6,386,554 B1 * | 5/2002 | Weddle | ....................... | 280/6.154 |
| 6,805,362 B1 * | 10/2004 | Melcher | ....................... | 280/5.52 |
| 6,874,793 B2 * | 4/2005 | Choudhery | ................ | 280/5.521 |
| 7,131,650 B2 * | 11/2006 | Melcher | ....................... | 280/5.52 |
| 7,357,400 B2 * | 4/2008 | Serra | ......................... | 280/86.751 |
| 7,387,314 B2 * | 6/2008 | White | .......................... | 280/781 |
| 7,438,143 B2 * | 10/2008 | Law et al. | ..................... | 180/9.52 |
| 7,461,712 B2 * | 12/2008 | Law et al. | ....................... | 180/41 |
| 7,537,223 B2 * | 5/2009 | Zetterstroem | .............. | 280/86.75 |
| 7,571,787 B2 * | 8/2009 | Saiki | ............................. | 180/210 |
| 7,591,337 B2 * | 9/2009 | Suhre et al. | ................... | 180/210 |
| 7,631,721 B2 * | 12/2009 | Hobbs | ........................... | 180/348 |
| 7,665,742 B2 * | 2/2010 | Haerr et al. | ................ | 280/5.508 |
| 2003/0111812 A1 * | 6/2003 | Carlstedt et al. | ......... | 280/124.16 |

* cited by examiner

*Primary Examiner* — Paul N Dickson
*Assistant Examiner* — Tashiana Adams
(74) *Attorney, Agent, or Firm* — Taylor IP, P.C.

(57) ABSTRACT

A steering axle assembly of a work machine such as an agricultural harvester includes telescoping axles and hub assemblies on the telescoping axles, with front and rear hydraulic cylinders for axially and angularly adjusting positions of the wheel hub assemblies, including steering the hubs to angles sufficient to minimize a width of the steering axle assembly for transport.

21 Claims, 4 Drawing Sheets

STEERING AXLE TRANSPORT POSITIONING STRUCTURE AND METHOD

FIELD OF THE INVENTION

The present invention relates to agricultural equipment such as harvesters, and, more particularly, to the steering axles on such equipment and the adjustment thereof for transport of the equipment.

BACKGROUND OF THE INVENTION

The width of an agricultural machine has an impact on the capacity that can be obtained from the machine. A trend in the design of agricultural machines, especially for harvesters and other equipment used to traverse a field, is for the size of the machines to become larger, reducing the number of passes required to cover a field. Agricultural harvesters, such as combines, include a head and a feeder housing which remove the crop material from the field, gather the crop material and transport the crop material to a separator in the harvester. The separator removes the grain crop material from the non-grain crop material. As the width of a harvester is increased, more crop material is processed and harvested. As a result, it is necessary to increase the capacity of processing equipment and crop storage bins on the harvester. The supporting structure, including the chassis and wheels, must be enlarged to provide the necessary stability for the overall larger size of the equipment. It is sometimes found necessary to increase the wheelbase of the equipment both in the distance between axles and in the width of the axle assembly to provide the necessary stability.

The maximum machine width attainable is limited by restrictions in allowable shipping within many countries. Machine configurations that maximize functional machine width and minimize transport width are desirable for providing increased capacity and productivity within a shippable overall configuration.

In some situations, the agricultural equipment is transported frequently. Accordingly, it is desirable that the "setup" process to prepare for shipping be performed quickly and efficiently. It is known to remove the cutting head for transport, and to remove wheels to reduce the machine with. Each of these can be done efficiently. With the cutting head removed, the widest point is often the distance from the outside tire surface of one wheel to the outside tire surface of the other wheel on the widest axle. Accordingly, it is known to remove the wheels from the wheel hubs to further reduce the machine width. Even this may be insufficient to meet maximum shipping width requirements, thus necessitating buying over-width shipping permits where available, or constraining the ability to market equipment in regions having firm over-width limits.

What is needed in the art is an axle assembly that can be extended beyond the shipping widths for providing stability on even the widest machines, and which can be narrowed significantly to meet stringent size limitations for shipping.

SUMMARY OF THE INVENTION

The present invention provides an extendable axle assembly for the steering axle of agricultural equipment which can be retracted and steered to an angle sufficient to reduce machine width at the widest point.

The invention in one form is directed to an agricultural work machine with a chassis and an axle assembly coupled to the chassis. The axle assembly includes first and second wheel hub assemblies and forward and rearward hydraulic cylinders coupled to each of the first and second wheel hub assemblies for angularly adjusting positions of the first and second wheel hub assemblies with respect to the chassis. The forward and rearward hydraulic cylinders are configured and arranged with respect to each other for steering the first and second wheel hub assemblies to a transport position in which the wheel hub assemblies are angled relative to the chassis sufficient to reduce the overall width of the axle assembly from a width with the first and second hub assemblies axially aligned with one another.

The invention in another form is directed to a steering axle with first and second wheel hub assemblies and forward and rearward hydraulic cylinders coupled to each of the first and second wheel hub assemblies for angularly adjusting positions of the hub assemblies. The forward and rearward hydraulic cylinders are configured and arranged with respect to each other so that the first and second wheel hub assemblies can be steered to angles for transport sufficient to narrow a width of the axle assembly.

The invention in still another form is directed to a method for preparing crop harvester for transport, the method having steps of removing wheels from an axle assembly of the harvester, and steering hubs on opposite ends of the axle in a same direction sufficiently to reduce an overall distance between outer edges of the hubs.

DETAILED DESCRIPTION OF THE INVENTION

Figure 1:
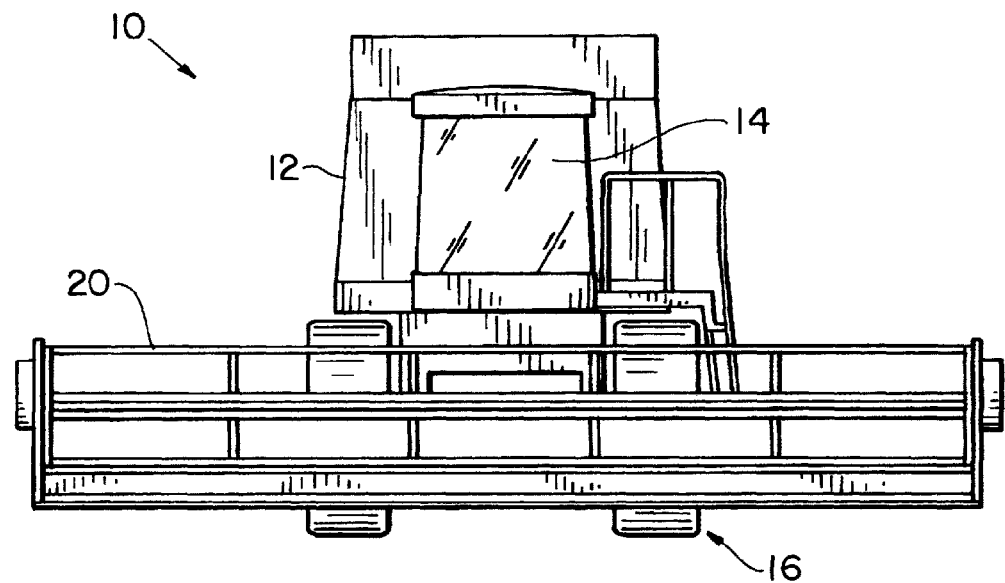
FIG. 1 is a front elevational view of an agricultural harvester in accordance with the present invention.
Figure 2:
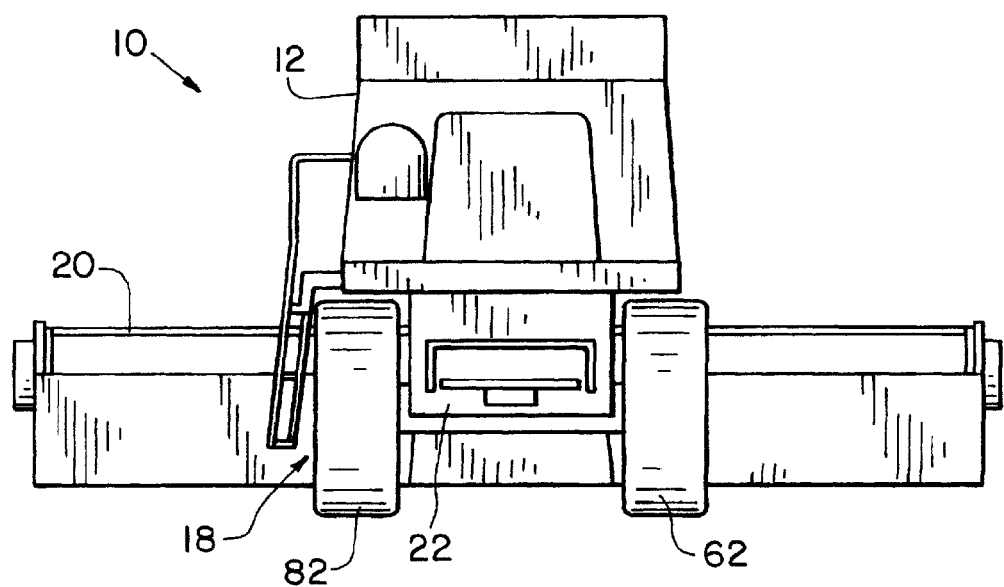
FIG. 2 is a rear elevational view of the agricultural harvester shown in FIG. 1, illustrating the end opposite the end shown in FIG. 1.

Referring now to the drawings and more particularly to FIGS. 1 and 2, there is shown an embodiment of a work machine 10 illustrated as an agricultural harvester 10. Harvester 10 generally includes a body 12, an operator cab 14, a front axle assembly 16 and a rear steering axle assembly 18. Harvester 10 is detachably coupled with a cutting platform or head 20 in front of operator cab 14 for harvesting crops in a field. A crop material is removed from the field by head 20 and transported from head 20 into a separator within harvester 10. The grain is separated from the non-grain refuse crop material, and the non-grain refuse crop material is discharged back onto the field via a straw chopper 22 at the back of harvester 10.

As known to those skilled in the art, steering is performed by the rear axle assembly, and the present invention is applied to rear steering axle assembly 18 of harvester 10. However, it should be understood that the present invention can be utilized on both steering and non-steering axles. Further, harvester 10 is shown as merely an example of equipment for which the present invention can be used. It should be understood that the present invention can be used also for harvesters of other types, and for equipment other than harvesters. For example and not limitation, the present invention also can be used for tractors, forage harvesters, sprayers, sugar cane harvesters and still other agricultural equipment, construction equipment and the like.

Figure 3:
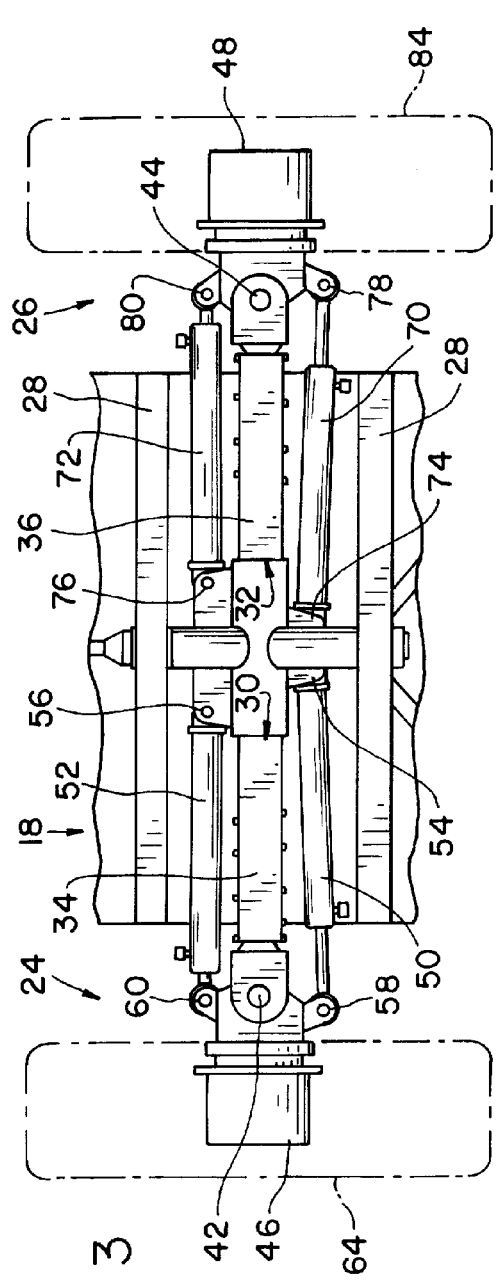
FIG. 3 is a top view of a steering axle assembly in accordance with the present invention, illustrating the steering axle assembly adjusted for straight-line operation.
Figure 4:
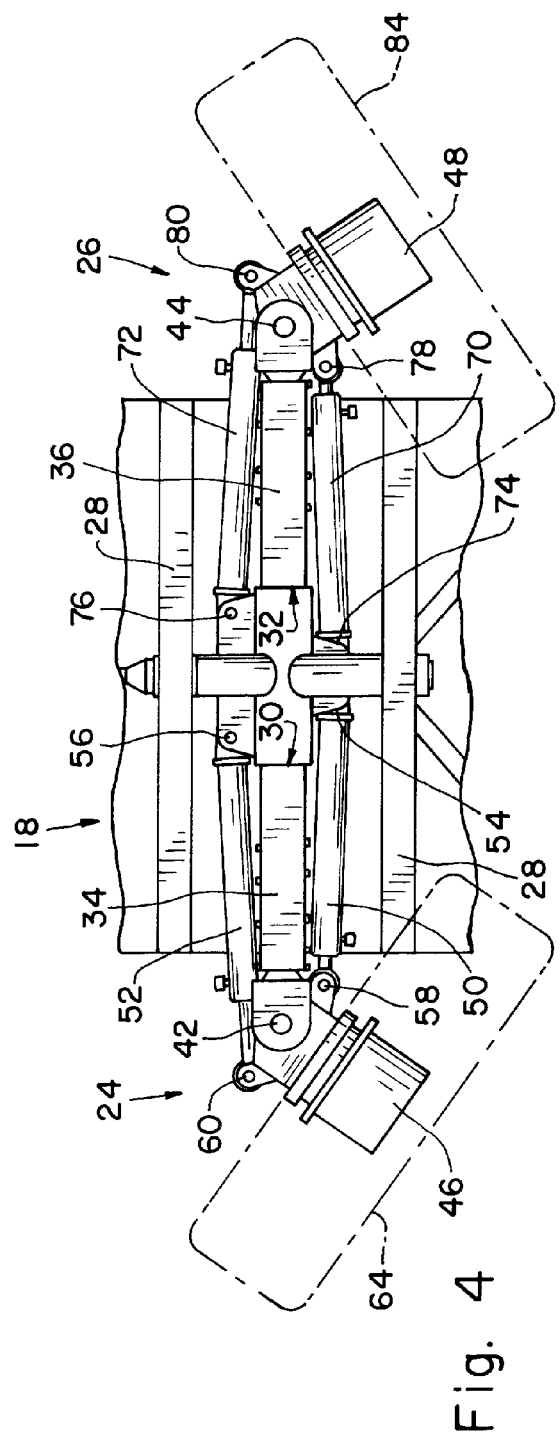
FIG. 4 is a top view similar to that of FIG. 3, but illustrating the steering axle assembly adjusted for transport.
Figure 5:
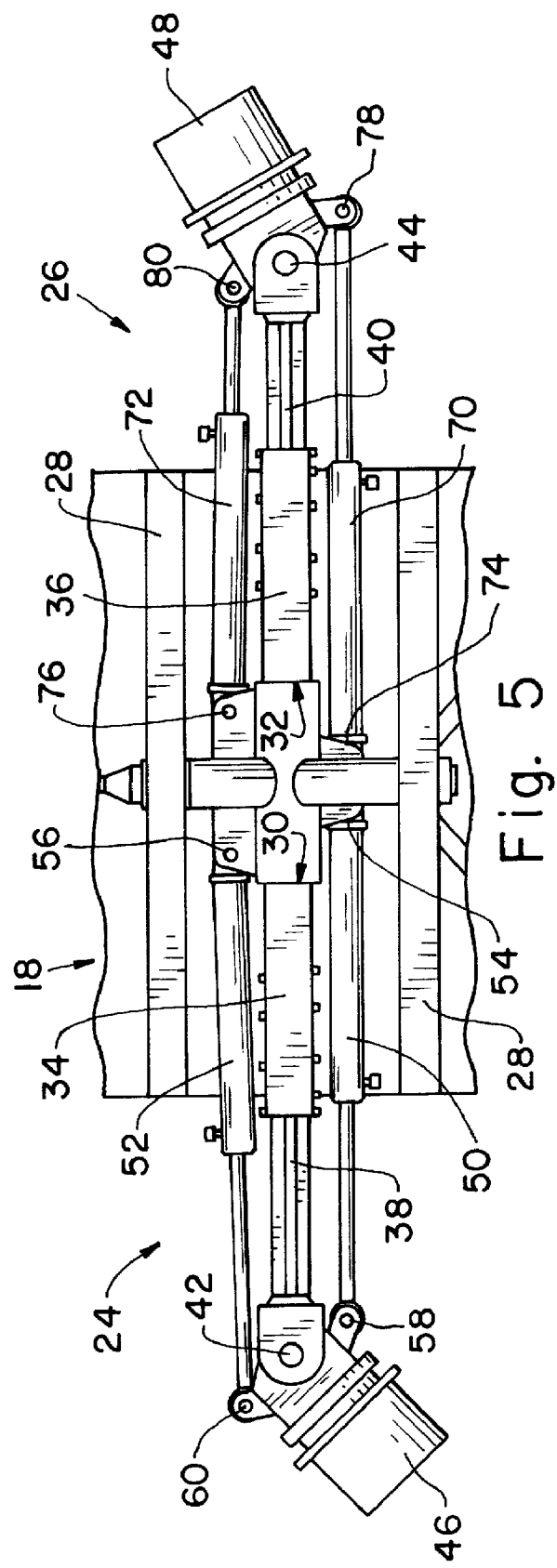
FIG. 5 is a top view similar to that of FIGS. 3 & 4, but illustrating the steering axle assembly adjusted for turning.
Figure 6:
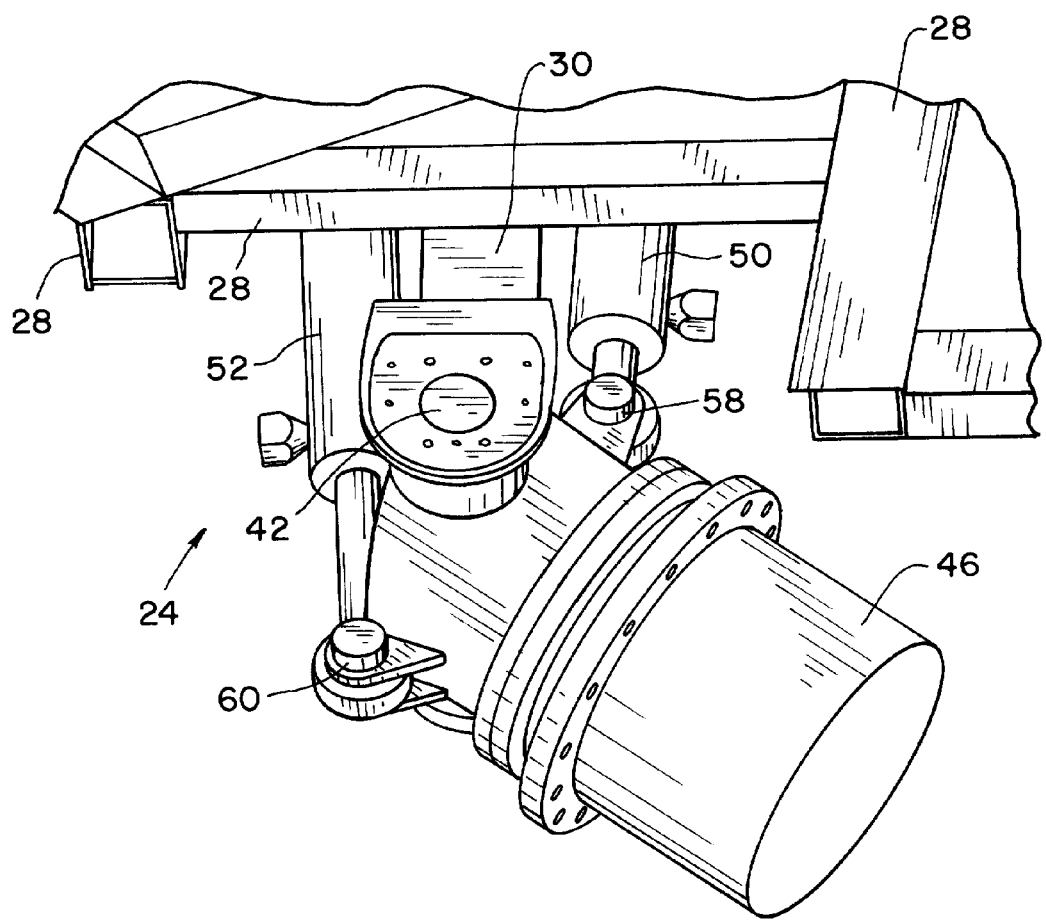
FIG. 6 is an enlarged view of a portion of the steering axle assembly shown in the previous drawings.

FIGS. 3-5 are top views of steering axle assembly 18 in accordance with the present invention. Steering axle assembly 18 includes first and second wheel assemblies 24, 26 secured to chassis members 28. Wheel assemblies 24, 26 include telescoping axles 30 and 32, respectively, having outer sleeves 34 and 36, respectively, and shafts 38 and 40, respectively, axially slidable therein. Shafts 38 and 40 form pivotal connections 42, 44 with wheel hub assemblies 46, 48 respectively.

Wheel assemblies 24, 26 are configured so as to extend and retract hub assemblies 46, 48 axially outwardly and inwardly relative to chassis members 28 by extending or retracting telescoping axles 30, 32. Wheel assemblies 24, 26 are further configured to change and/or adjust the angular orientation of hub assemblies 46, 48 relative to chassis members 28 for steering and for positioning during transport. In this regard, each wheel assembly 24, 26 includes a pair of hydraulic cylinders for moving and positioning hub assemblies 46, 48 both axially and angularly. As discussed above and as seen in FIGS. 3-6, the axial extension/retraction and angular positioning of hub assemblies 46 and 48 is accomplished solely by operation of hydraulic cylinders 50 and 52.

More specifically, wheel assembly 24 includes a forward hydraulic cylinder 50 and a rearward hydraulic cylinder 52 on opposite sides of telescoping axle 30. Cylinders 50 and 52 have inboard connections 54, 56 relative to chassis members 28 and pivotal outboard connections 58, 60 to hub assembly 46. Inboard connection 56 of rearward hydraulic cylinder 52 is positioned outwardly of inboard connection 54 for forward hydraulic cylinder 50 so that pivotal outboard connection 60 is outwardly of pivotal connection 58 when hydraulic cylinders 50 and 52 are extended equal lengths. This enables wheel hub assembly 46 to be steered dramatically forward when forward hydraulic cylinder 50 is fully retracted and rearward hydraulic cylinder 52 is at least partly extended. Alternatively, rearward hydraulic cylinder 52 can be longer than forward hydraulic cylinder 50 or can have a longer extendable length than hydraulic cylinder 50 so as to achieve the desired dramatic angle of wheel hub assembly 46. A wheel 62 (FIG. 2), which may include a rim and a tire, is provided on wheel hub assembly 46. Wheel 62 is not shown in FIGS. 3 and 4. However, an outline of the space that would be required for wheel 62 if it was mounted on the hub assembly is shown as a dashed line designated 64 in FIGS. 3 and 4.

Wheel assembly 26 includes a forward hydraulic cylinder 70 and a rearward hydraulic cylinder 72 on opposite sides of telescoping axle 32. Cylinders 70 and 72 have inboard connections 74, 76 relative to chassis members 28 and pivotal outboard connections 78, 80 to hub assembly 48. Inboard connection 76 of rearward hydraulic cylinder 72 is positioned outwardly of inboard connection 74 for forward hydraulic cylinder 70 so that pivotal outboard connection 80 is outwardly of pivotal connection 78 when hydraulic cylinders 70 and 72 are extended equal lengths. This enables wheel hub assembly 48 to be steered dramatically forward. Alternatively, rearward hydraulic cylinder 72 can be longer than forward hydraulic cylinder 70 or can have a longer extendable length than hydraulic cylinder 70 so as to achieve the desired dramatic angle of wheel hub assembly 48. A wheel 82 (FIG. 2), which may include a rim and a tire, is provided on wheel hub assembly 48. Wheel 82 is not shown in FIGS. 3 and 4. However, an outline of the space that would be required for wheel 82 if it was mounted on the hub assembly is shown as a dashed line designated 84 in FIGS. 3 and 4.

By the selective adjustment of hydraulic cylinders 50, 52, 70 and 72 wheel assemblies 24, 26 can be positioned inwardly, outwardly and angularly relative to chassis members 28 and telescoping axles 30 and 32. Accordingly, for straight-line operation of harvester 10, wheel assemblies 24, 26 can be positioned close to chassis members 28 by retracting telescoping axles 30, 32 as shown in FIG. 3, with hub assemblies 46 and 48 axially aligned with telescoping axles 30 and 32. Alternatively, if desired based on the field conditions or other operating conditions, wheel assemblies 24, 26 can be positioned more outwardly of chassis members 28 for straight-line operation.

For steering maneuvering, wheel assemblies 24, 26 can be positioned outwardly of and angularly with respect to chassis members 28 so that tires disposed on hub assemblies 46, 48 clear chassis members 28 when angularly disposed relative to chassis members 28. FIG. 5, illustrates axle assembly 18 adjusted for turning, but illustrates the axle assembly without tires and wheels connected to hub assemblies 46, 48.

When harvester 10 is prepared for transport, wheels 62 and 82 thereof can be removed, and wheel hub assemblies 46 and 48 can be angled sufficiently to further reduce the width between outer edges of the hub assemblies. To achieve the angle of hub assemblies 46 and 48, forward hydraulic cylinders 50, 70 are retracted, and rearward hydraulic cylinders 52, 72 are extended. Telescoping axles 30, 32 are fully retracted, and wheel hub assemblies 46, 48 are steered forward as illustrated in FIG. 4 so that the overall width of rear steering axle assembly 18 is reduced even beyond that present when wheel hub assemblies 46, 48 are axially aligned with telescoping axles 30, 32 as shown in FIG. 3. With telescoping axles 30 and 32 fully retracted, the angle for hub assemblies 46 and 48 sufficient to reduce the overall width of axle assembly 18 cannot be achieved with wheels 62 and 82 installed. As shown by outlines a 64, 84 in FIG. 4, if wheels 62, 82 were in place, interference with body 12 and chassis members 28 would occur before the required angle is achieved.

The present invention has been illustrated and described herein with a forward angle for wheel hub assemblies 46, 48. However, it should be understood that the desired width adjustment can be achieved also with a rearward angle of the wheel hub assemblies. To achieve such a rearward angle, the relative positions of the inboard and outboard connections of the forward and rearward hydraulic cylinders would be reversed such that by extending the forward hydraulic cylinders and retracting the rearward hydraulic cylinders the hub assemblies are angled dramatically rearward. It should be understood further that the wheel hub assemblies also can be angled in opposite directions, with one wheel hub assembly angled forward and the other rearward, to achieve the desired overall reduction in width.

Having described the preferred embodiment, it will become apparent that various modifications can be made without departing from the scope of the invention as defined in the accompanying claims.

The invention claimed is:
1. An agricultural work machine, comprising:
a chassis; and
an axle assembly coupled to said chassis, said axle assembly including;
first and second wheel hub assemblies;
forward and rearward hydraulic cylinders coupled to each said first and second wheel hub assemblies for angularly adjusting positions of said first and second wheel hub assemblies with respect to said chassis;

said forward and rearward hydraulic cylinders configured and arranged with respect to each other for steering said first and second wheel hub assemblies to a transport position in which said wheel hub assemblies are angled relative to said chassis sufficient to reduce the overall width of said axle assembly from a width with said first and second hub assemblies axially aligned with one another; and first and second telescoping axles pivotally connected to said first and second wheel hub assemblies, said forward and rearward hydraulic cylinders configured and arranged for axially extending and retracting said telescoping axles and for angularly positioning said wheel hub assemblies, said angular positioning and said axial extending and retracting motions being accomplished solely by operation of said forward and rearward hydraulic cylinders.

2. The agricultural work machine of claim 1, wherein said first and second wheel hub assemblies are angled forward for transport.

3. The agricultural work machine of claim 1, wherein said first and second telescoping axles are fully retracted and said first and second wheel assemblies are angled forward for transport.

4. The agricultural work machine of claim 1, said forward and rearward hydraulic cylinders being pivotally connected to said first and second wheel hub assemblies.

5. The agricultural work machine of claim 4, wherein said pivotal connections of said rearward hydraulic cylinders to said first and second wheel hub assemblies are outwardly of said pivotal connections of said forward hydraulic cylinders to said first and second wheel hub assemblies when said forward and rearward hydraulic cylinders are extended equal lengths.

6. The agricultural work machine of claim 1, said axle assembly being a steering axle.

7. The agricultural work machine of claim 1, wherein said transport position cannot be achieved with wheels on said wheel hub assemblies.

8. A steering axle couplable to a work machine, said steering axle comprising:

first and second wheel hub assemblies;

forward and rearward hydraulic cylinders coupled to each said first and second wheel hub assemblies for angularly adjusting positions of said first and second wheel hub assemblies with respect to said chassis;

said forward and rearward hydraulic cylinders configured and arranged with respect to each other so that said first and second wheel hub assemblies are steerable to a transport position in which said wheel hub assemblies are angled sufficiently to reduce the overall width of said axle assembly from a width with said first and second hub assemblies axially aligned with one another; and first and second telescoping axles pivotally connected to said first and second wheel hub assemblies, said forward and rearward hydraulic cylinders configured and arranged for axially extending and retracting said telescoping axles and for angularly positioning said wheel hub assemblies, said angular positioning and said axial extending and retracting being accomplished solely by operating of said forward and rearward hydraulic cylinders.

9. The steering axle of claim 8, wherein said first and second wheel hub assemblies are angled forward for transport.

10. The steering axle of claim 8, wherein said first and second telescoping axles are fully retracted and said first and second wheel assemblies are angled forward for transport.

11. The steering axle of claim 8, said forward and rearward hydraulic cylinders being disposed on opposite sides of said telescoping axles.

12. The steering axle of claim 8, said forward and rearward hydraulic cylinders being pivotally connected to said first and second wheel hub assemblies.

13. The steering axle of claim 12, wherein said pivotal connections of said rearward hydraulic cylinders to said first and second wheel hub assemblies are outwardly of said pivotal connections of said forward hydraulic cylinders to said first and second wheel hub assemblies when said forward and rearward hydraulic cylinders are extended equal lengths.

14. The steering axle of claim 8, wherein said steered angles of said wheel hub assemblies for transport require wheels to be removed from said wheel hub assemblies.

15. A method for preparing a crop harvester for transport, said method comprising steps of:

removing wheels from an axle assembly of the harvester;

steering hubs on opposite ends of the axle assembly to angles sufficient to reduce an overall distance between outer edges of the hubs; and retracting telescopic axles of the axle assembly, said steering hubs and said retracting telescoping axles steps being accomplished solely by operation of forward and rearward hydraulic cylinders positioned on opposite sides of said telescoping axles.

16. The method of claim 15, further comprising a step of extending said telescoping axles of the axle assembly.

17. The method of claim 16, wherein said steering step angles the hubs toward the front of the harvester.

18. The method of claim 15, wherein said steering step angles the hubs toward the front of the harvester.

19. The method of claim 15, wherein said forward hydraulic cylinders and said rearward hydraulic cylinders are arranged in a generally horizontal plane with said telescoping axles.

20. The method of claim 19, further comprising a step of fully retracting telescoping axles of the axle assembly.

21. The method of claim 15, said steering step performed to move the hubs to an angle that can not be achieved with wheels on the hubs.

* * * * *